C. J. RANDALL.
PROCESS FOR SOLIDIFYING CARBON AND SIMILAR MATERIALS.
APPLICATION FILED JULY 30, 1920.
1,384,089.
Patented July 12, 1921.
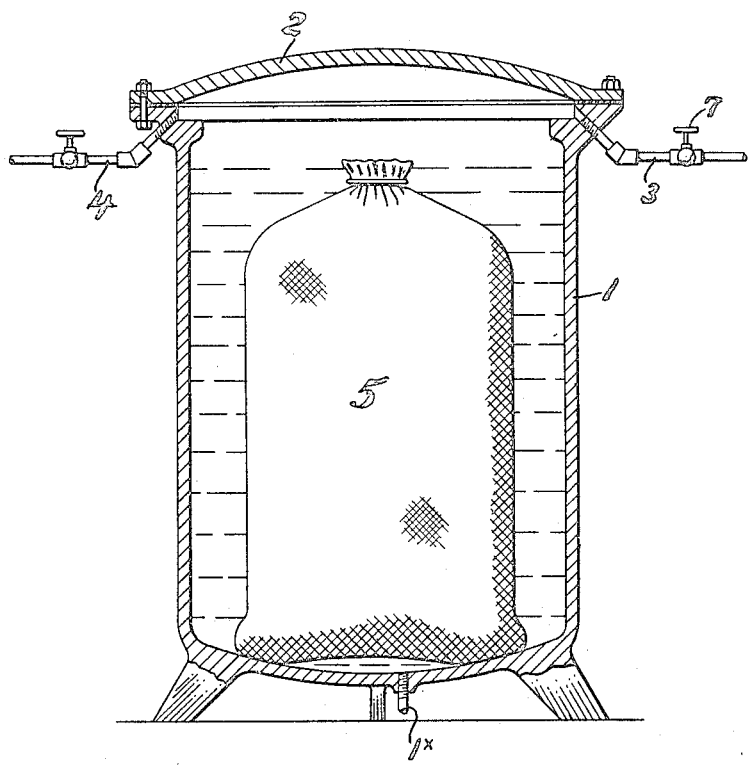
Inventor.
Chester J. Randall,
By his Attorney.
Ernest Hopkinson

UNITED STATES PATENT OFFICE.

CHESTER J. RANDALL, OF NAUGATUCK, CONNECTICUT, ASSIGNOR TO THE GOODYEAR'S METALLIC RUBBER SHOE COMPANY, A CORPORATION OF CONNECTICUT.

PROCESS FOR SOLIDIFYING CARBON AND SIMILAR MATERIALS.

1,384,089.    Specification of Letters Patent.    Patented July 12, 1921.

Original application filed July 26, 1919, Serial No. 313,660. Divided and this application filed July 30, 1920. Serial No. 400,275.

*To all whom it may concern:*

Be it known that I, CHESTER J. RANDALL, a citizen of the United States, residing at Naugatuck, county of New Haven, State of Connecticut, have invented new and useful Improvements in Processes for Solidifying Carbon and Similar Materials, of which the following is a full, clear, and exact description.

In the packing, shipment, and use of carbon black and similar materials, considerable annoyance and trouble has been experienced by the flying particles of the carbon which as is well known do not remain in compact form after manufacture, but are easily disposed to fly about in the air. Particularly in the manufacture and compounding of rubber, the carbon particles disperse and fly about in the work room to the annoyance of the workmen and detriment of any white goods that may be present. Various processes have been devised for compacting the carbon by the use of various binders and liquids, but these have the objection that foreign materials are introduced into the carbon and into the articles into whose composition the carbon enters.

This invention has as an object to compact the carbon and thereby put it into such shape that it will not disperse and fly about when handled and it has also as an object the compaction of carbon without the aid of binders or liquids. It has also as an object the compaction of carbon by a very simple and efficient process.

The invention broadly stated consists in a process of compacting carbon particles or similar materials comprising exhausting air from between the particles and subjecting them to pressure.

The invention in its preferred embodiment is carried out in the apparatus illustrated by the figure of the drawing which represents a cross-section of the exhaustion and compression chamber.

In the drawing the tank or chamber 1 is shown provided with a cover 2 which may be fastened to the chamber by bolts, gaskets being inserted to secure hermetic sealing. A pipe 1ˣ is provided for the withdrawal of liquids, such as water, from the chamber. Leading into the chamber is a pipe 3 provided with valve 7, which pipe is connected to an exhaust means for exhausting the air from the chamber. A pipe 4 provided with a valve serves for introducing fluids such as water or gas or air under pressure.

In the operation of this device, the carbon contained in a bag 5, constructed to permit the passage of air therefrom, is placed within the tank 1, water preferably covering the top of the bag. The closure 2 is then secured in position and the air within the tank and material is exhausted through the pipe 3, the air passing up from the material through the water in the form of bubbles. In practice the interior of the chamber may be brought to a vacuum of 28 inches. After exhausting the air from the chamber and material, valve 7 is closed and a fluid under pressure such as water, gas or air is admitted into the chamber through pressure pipe 4. In practice a pressure of approximately 40 lbs. per square inch for a period of 5 minutes is desirable. The exhaust of air through suction pipe 3 permits the air pockets or voids between the particles to be reduced, and the subsequent application of pressure through the pipe 4 enables the particles to be compacted or pressed together so as to very considerably reduce their total bulk.

The apparatus is of course only illustrative and may take on various forms as long as it serves as an instrument for carrying out the process of the invention. The process may likewise be varied, for example, air under pressure may be introduced above the surface of the water which will have the effect of compressing the water around the bag 5. In practice the bag 5 is of course not strictly waterproof and some of the water leaks into the carbon, but this does no harm and the carbon may be later dried out, if desired.

This case is a division of Serial No. 313,660, filed July 26, 1919.

As many apparently widely different embodiments of this invention may be made without departing from the spirit thereof, it will be understood that I do not intend to limit myself to the specific embodiment herein set forth, except as indicated in the appended claims.

Having thus described my invention, what I claim and desire to protect by Letters Patent is:

1. The process of treating carbon particles, comprising exhausting air from between the particles and subjecting them to pressure.

2. The process of treating carbon particles, comprising placing the carbon within a bag constructed to permit the passage of air therefrom, exhausting the bag and its contents of air and then compressing the bag to compact its contents.

3. The process of compacting pulverulent material, which consists in immersing material in bulk in a liquid, lowering the air pressure on the surface of the liquid and then increasing the pressure on the surface of the liquid above that to which it was lowered.

4. The process of compacting carbon or similar materials, comprising placing the carbon within a bag constructed to permit the passage of air therefrom, immersing the bag in a liquid, lowering the pressure on the surface of the liquid, and then increasing the pressure on the surface of the liquid above that to which it was lowered.

5. The process of compacting carbon or similar materials, comprising placing the carbon within a bag constructed to permit the passage of air therefrom, immersing the bag in a fluid contained in a chamber, closing the latter and exhausting it of air whereby the air associated with the carbon bubbles through the fluid and is removed by the exhaust, shutting off the exhaust and admitting fluid under pressure to compact the carbon, and then removing the bag and its contents.

6. The process of compacting carbon or similar materials, comprising placing the carbon within a bag constructed to permit the passage of air therefrom, immersing the bag under water in a chamber, closing the latter and exhausting it of air whereby the air, associated with the carbon, bubbles through the water and is removed by the exhaust, shutting off the exhaust and admitting water under 40 lbs. pressure to the chamber, maintaining the pressure for about 5 minutes until the carbon is compacted, and then removing the bag and its contents.

Signed at Naugatuck, Connecticut, this 24th day of July, 1920.

CHESTER J. RANDALL.